United States Patent
Dupuis

(10) Patent No.: US 7,292,385 B2
(45) Date of Patent: Nov. 6, 2007

(54) MIRROR WITH LOCAL DEFORMATION BY THICKNESS VARIATION OF AN ELECTRO-ACTIVE MATERIAL CONTROLLED BY ELECTRICAL EFFECT

(75) Inventor: Jean Dupuis, Auribeau sur Siagne (FR)

(73) Assignee: Thales, Neuilly sur Seine (FR)

( * ) Notice: Subject to any disclaimer, the term of this patent is extended or adjusted under 35 U.S.C. 154(b) by 58 days.

(21) Appl. No.: 11/228,335

(22) Filed: Sep. 19, 2005

(65) Prior Publication Data

US 2007/0223118 A1    Sep. 27, 2007

(30) Foreign Application Priority Data

Sep. 20, 2004  (FR) .................................. 04 52092

(51) Int. Cl.
*G02B 26/08*  (2006.01)
(52) U.S. Cl. ..................... 359/291; 359/295; 359/846; 359/872; 359/883
(58) Field of Classification Search ................ 359/290, 359/291, 295, 298, 846, 872, 883
See application file for complete search history.

(56) References Cited

U.S. PATENT DOCUMENTS

| 4,001,635 | A | * | 1/1977 | D'Auria et al. ............. 359/291 |
| 5,319,491 | A | * | 6/1994 | Selbrede ..................... 359/291 |
| 5,521,747 | A | * | 5/1996 | Engle ......................... 359/292 |
| 5,526,172 | A | * | 6/1996 | Kanack ....................... 359/291 |
| 6,749,556 | B2 | * | 6/2004 | Banik ......................... 600/30 |
| 7,034,432 | B1 | * | 4/2006 | Pelrine et al. .............. 310/309 |
| 7,054,054 | B1 | * | 5/2006 | Srinivasan et al. ......... 359/295 |
| 2003/0166773 | A1 |  | 9/2003 | Chen |

FOREIGN PATENT DOCUMENTS

| EP | 0 793 120 A1 | 9/1997 |
| EP | 1 637 914 A1 | * | 3/2006 |

OTHER PUBLICATIONS

T. Weyrauch et al, "Performance Evaluation of Micromachined Mirror Arrays for Adaptive optics" Proceedings of the SPIE—The International Society for Optical Engineering Soc. Opt. Eng, vol. 4124, 2000, pp. 32-41, XP00232350.

Claire Divoux: "A Micromachined Micromachined Deformable Mirror for Adaptive Optics", Online! 2003, XP002323249.

* cited by examiner

*Primary Examiner*—Evelyn A. Lester
(74) *Attorney, Agent, or Firm*—Sughrue Mion, PLLC

(57) ABSTRACT

A deformable mirror comprises i) an electrically insulative substrate having a substantially plane front face, ii) a first stage comprising at least two plane electrodes placed at chosen places on top of said front face of the substrate, iii) a first layer of electro-active material placed in contact with the front face of the electrodes of said first stage and adapted to be deformed locally under the action of a chosen local difference of electric potential, iv) an electrically conductive reflecting layer, defining a ground electrode connected to an electric ground and placed on top of the front face of said first electro-active layer, and v) first electric power supply circuits each connected, on the one hand, to said electric ground and, on the other hand, to at least one of the electrodes of said first stage in such a manner as to impose locally, on command, a chosen potential difference adapted to deform locally an area of the first electro-active layer placed substantially in line with said electrode.

20 Claims, 4 Drawing Sheets

MIRROR WITH LOCAL DEFORMATION BY THICKNESS VARIATION OF AN ELECTRO-ACTIVE MATERIAL CONTROLLED BY ELECTRICAL EFFECT

CROSS-REFERENCE TO RELATED APPLICATIONS

This application is based on French Patent Application No. FR 04 52 092 filed Sep. 20, 2004, the disclosure of which is hereby incorporated by reference thereto in its entirety, and the priority of which is hereby claimed under 35 U.S.C. § 119.

BACKGROUND OF THE INVENTION

1. Field of the Invention

The invention concerns the field of optical instruments with high, or even very high, resolution.

2. Description of the Prior Art

As the man skilled in the art knows, certain optical instruments have geometrical aberrations that it is increasingly imperative to compensate the higher the required resolution.

At least two solutions have been proposed for compensating these geometrical aberrations.

A first solution consists in using liquid crystals to vary the index of the glass under the action of an electric field. The drawback of this solution resides in the fact that it generates chromatic aberrations, to the extent that it is difficult to apply to multi-spectrum instruments or to instruments with a wide spectral band.

A second solution consists in using deformable (or active) mirrors. Here it is a question of controlling the deformation of the reflecting surface of a mirror at the level of a pupil of the observation instrument whose geometrical aberrations must be compensated.

Thus the University of Delft has proposed placing, at a chosen distance from a substrate including a printed circuit on which are defined electrodes connected to electrical power supply circuits, a suspended reflecting membrane connected to the ground of said electrical power supply circuits. By placing an electrode at a chosen electrical potential, the suspended reflecting membrane is drawn toward that electrode and is therefore deformed.

This solution has at least two drawbacks.

A first drawback is due to the integration of the membrane onto its support. The stresses of fixing the flexible membrane to the circular mount in effect generate deformations that must be minimized mechanically and that may reappear under the effect of temperature variations or local temperature gradients.

A second drawback is due to the electrostatic force applied by the actuators (or electrodes) to the membrane. In effect, this electrostatic force being proportional to the square of the applied voltage (V2), the actuators can exert on the membrane only a traction force that tends to move it toward them. It is consequently necessary to apply an offset voltage to move the plane of the membrane closer to the plane of the electrodes in such a manner as to attempt to create bosses on the membrane by locally relaxing the traction force. This solution imposes using a portion of the actuation capacity of the electrodes. Because of its high curvature, a peripheral ring of the mirror can therefore no longer be used to correct aberrations, which induces a reduction of the usable area. Furthermore, in the event of power supply failure, and therefore disappearance of the offset voltage, the displacement of the reflecting membrane and its curvature variation change the setting of the instrument, which may render the image unusable.

No known solution providing entire satisfaction, an object of the invention is therefore to improve on the situation.

SUMMARY OF THE INVENTION

To this end it proposes a deformable mirror comprising i) an electrically insulative substrate (preferably rigid) having a substantially plane front face, ii) a first stage comprising at least two plane electrodes placed at chosen places on top of said front face of the substrate, iii) a first layer of electro-active material placed in contact with the front face of the electrodes of said first stage and adapted to be deformed locally under the action of a chosen local difference of electric potential, iv) an electrically conductive reflecting layer, defining a ground electrode connected to an electric ground and placed on top of the front face of said first electro-active layer, and v) first electric power supply circuits each connected, on the one hand, to said electric ground and, on the other hand, to at least one of the electrodes of said first stage in such a manner as to impose locally, on command, a chosen potential difference adapted to deform locally an area of the first electro-active layer placed substantially in line with said electrode.

The mirror according to the invention can have other features that may be taken separately or in combination, and in particular:

i) at least one second stage comprising at least two plane electrodes interleaved between said front face of the substrate and the rear face of the first stage, ii) at least one conductive interleaved layer, defining a ground electrode connected to said electric ground and interleaved between the rear face of the first stage and said second stage, iii) at least one second layer of electro-active material, interleaved between the front face of the electrodes of said second stage and the rear face of said conductive interleaved layer, and adapted to be deformed locally under the action of a chosen difference of electric potential, and iv) second electric power supply circuits each connected, on the one hand, to said electric ground and, on the other hand, to at least one of the electrodes of said second stage in such a manner as to impose locally, on command, a chosen difference of potential adapted to deform locally an area of the second electro-active layer placed substantially in line with said electrode, the electrodes of each stage may be substantially of the same shape and placed substantially one on top of the other, the electrodes of each stage may be substantially of the same shape and placed one on top of the other in partially offset positions so as to partially overlap, each layer of electro-active material may be attached by adhesion to the layers that surround it, at least one insulative interleaved layer may be interleaved between the rear face of the first stage of electrodes and said conductive interleaved layer, each stage may be a printed circuit on which said electrodes are defined, the electrodes of each stage may be of substantially hexagonal shape and disposed relative to each other in accordance with a triangular paving, at least one of the electrodes of each stage may comprise at least one recess of chosen shape. This recess is of star shape with n branches, for example, the electrodes may be connected to their respective electric power supply circuits by their rear face, or in their plane, for example by using interstices of the paving, each local deformation is preferably a function of the chosen difference of potential, of the thickness of the electro-active layer concerned and of the type of the electro-active material of said electro-active layer concerned, the electro-active material may be a terpolymer, for example a copolymer doped with fluorine, the reflecting layer may be made from a metallic material, at least one semi-rigid and conductive (or rendered conductive) interleaved additional layer can be placed between said reflecting layer (defining a ground electrode) and said first electro-active layer. This interleaved additional layer may have a thickness comprised between about 10 microns and a few hundreds of microns, for example. Furthermore, this interleaved additional layer may be attached by adhesion to the layers around it.

The invention is particularly well adapted, although not exclusively so, to optical instruments used in the context of spatial or terrestrial remote sensing. Such optical instruments comprise, for example, a telescope coupled to a deformable mirror of the type described hereinabove. Moreover, these optical instruments can also comprise servocontrol means responsible for effecting measurements on the active face of their deformable mirror in order to control its shape by the voltages applied to its various electrodes.

BRIEF DESCRIPTION OF THE DRAWINGS

Other features and advantages of the invention will become apparent on examining the following detailed description and the appended drawings, in which.

DETAILED DESCRIPTION OF THE PREFERRED EMBODIMENTS

The appended drawings constitute part of the description of the invention as well as, if necessary, contributing to the definition of the invention.

The relative dimensions of the elements represented in the figures are not representative of the real relative dimensions.

Figure 1:
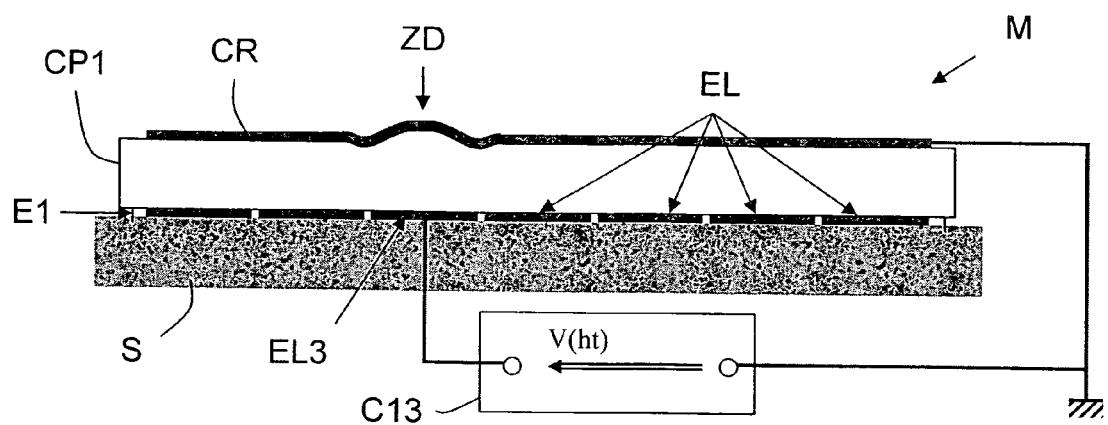
FIG. 1 shows diagrammatically, in a view in cross section, a first embodiment of a deformable mirror according to the invention.
Figure 2:
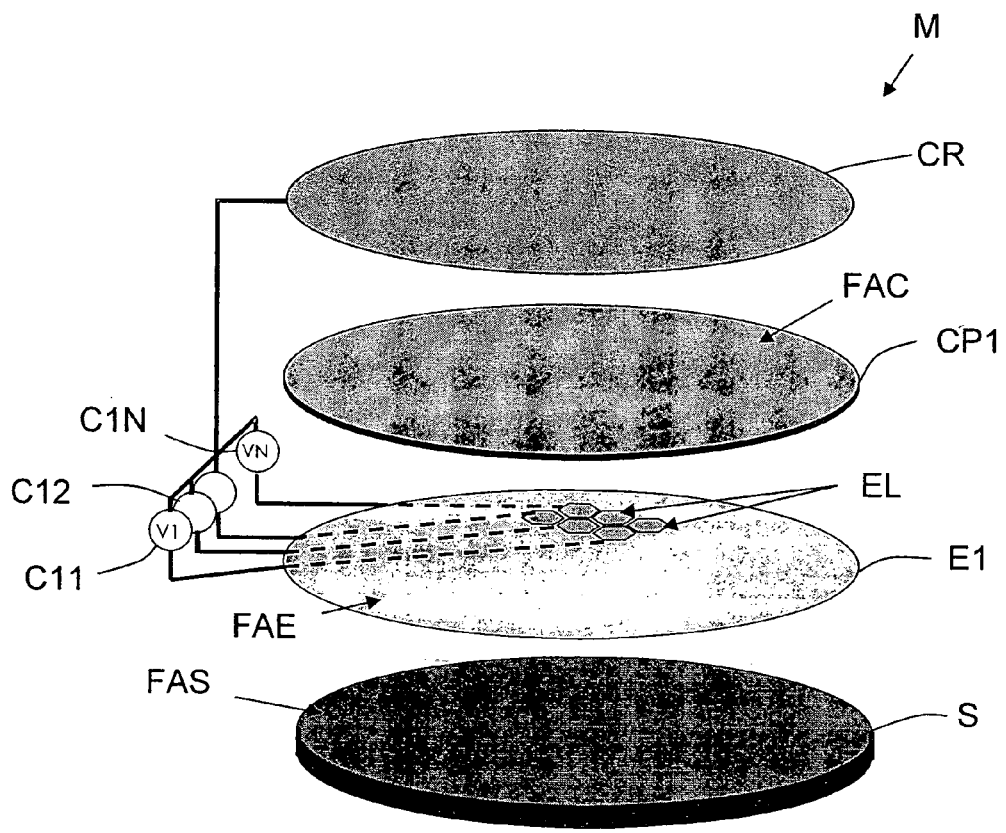
FIG. 2 shows diagrammatically, in an exploded perspective view, the main components of the deformable mirror from FIG. 1.

FIGS. 1 and 2 are referred to first to describe a first embodiment of a deformable (or active) mirror according to the invention.

As indicated in the introduction part, a deformable mirror M is intended to compensate the geometric aberrations of an optical instrument at the level of one of its pupils.

In what follows, it is considered by way of illustrative, non-limiting, example that the optical instrument is a remote sensing instrument, possibly of high resolution, embarked on one or more spacecraft, such as one or more satellites, for example, or a space shuttle, and intended to observe the Earth from space. The light flux must be analyzed after passing through the instrument, which introduces the geometric aberrations, but the latter may be corrected at any point, preferably also at the output, for reasons of compactness. Thus an image of the exit pupil of the instrument is produced on the active face of the mirror. In this case, the pass-band of the mirror is about a few Hertz for a few tens of microns of deformation at the maximum.

However, the invention is not limited to this application. It may be used in any type of optical instrument having geometric aberrations, and in particular in the field of terrestrial astronomy (for example for the correction of aberrations due to the atmosphere—in this case the pass-band of the mirror is about 100 Hertz for a few microns of deformation), or in the field of scientific instrumentation (in particular lasers, notably power lasers), or in the industrial field, or again in the field of medical imaging (in particular of opthalmology). The invention may equally be applied to the shape correction of a large mirror, such as a primary telescope mirror, or to each of its portions in the case of a segmented large mirror.

Moreover, it is considered in what follows that the mirror M is plane, but this is not an obligation.

As is shown in FIG. 1, a deformable mirror M, according to the invention, is constituted of a stack of an electrically insulative substrate S having a substantially plane front face FAS, at least one first stage E1 comprising at least two plane electrodes EL connected to electric power supply circuits C1$i$ (i=1 to N), at least one first layer CP1 of electro-active material, and one electrically conductive reflecting layer CR defining a ground electrode connected to the electrical ground of the power supply circuits C1$i$.

To be more precise, in the example shown in FIGS. 1 and 2, the substrate S comprises a front face FAS to which is attached the first stage E1 of plane electrodes EL. The substrate S is preferably rigid. It is for example made of a material such as glass (for example of ULE® or Zerodur® type). However, any other stable and electrically insulative (or insulated) material may be used, and in particular composite materials of carbon-carbon type or sintered SiC.

Figure 3:
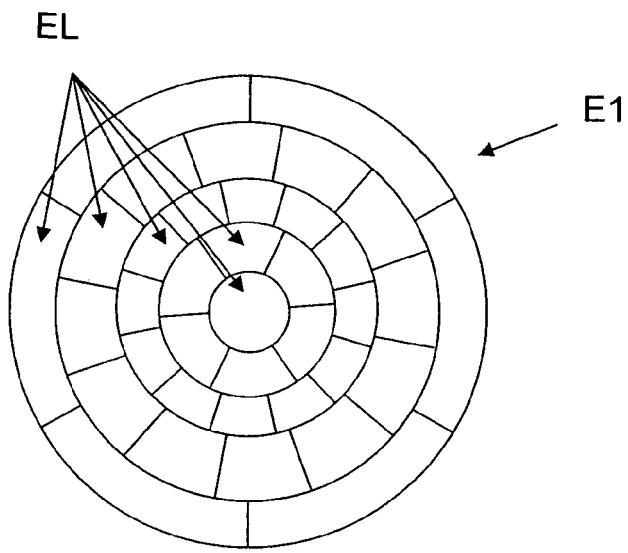
FIG. 3 shows diagrammatically, in a plan view, one example of paving of plane electrodes.

The plane electrodes EL of the first stage E1 are placed in chosen places under the rear face of the first electro-active layer CP1 (opposite its front face FAE), in such a manner as to allow the deformation of chosen areas of the latter, as will be seen later. They are for example of hexagonal shape and arranged relative to each other to constitute a triangular paving. However, other shapes may be envisaged for the electrodes, of course. Likewise, any other type of positioning of electrodes may be envisaged, such as for example that shown in FIG. 3 which includes about 40 plane and coplanar electrodes arranged within five concentric rings.

As is shown diagrammatically in FIG. 2, the first stage E1 is for example a printed circuit on which are defined, in particular, the plane electrodes EL. However, defining the electrodes EL directly on the front face FAS of the substrate S, for example by vacuum deposition, may equally be envisaged.

The first electro-active layer CP1 is placed in contact with the front face FAE of the first stage E1 and therefore its electrodes EL. It is made from an electro-active material that can be deformed locally under the action of a chosen local difference of electrical potential. The electro-active material is preferably a terpolymer, such as for example a copolymer doped with fluorine. Even more preferably, the electro-active material is a P[VF2 VF3 CFE] polymer composed of three monomers VF2 (or VDF (vinyl difluoride)), VF3 (or TrFE (trifluoride of ethylene)) and CFE (or chlorofluoride of ethylene), called ISL 3. Such a material is synthesized by ISL (Institut Franco-Allemand de Saint Louis en France).

The first electro-active layer CP1 may be made, for example, by d spin coating technique. This technique consists in depositing a small quantity of material on the surface to be covered and then driving said surface in rotation so that the material spreads homogeneously until it constitutes a layer of chosen thickness. Alternatively, the electro-active layer may equally be produced by liquid phase deposition. To this end, one may for example apply the polymer after having mixed it with a solvent, which leaves after drying a film having a good surface state. In another variant, this film may be made directly by spraying onto the support surface.

The number of first power supply circuits $C1i$ is preferably equal to the number of electrodes EL of the first stage E1, in such a manner as to allow the placing of each electrode at an electric potential chosen independently of the other electrodes of the first stage E1. Thus, in the presence of N electrodes EL one can deform selectively, by controlling the N power supply circuits C11 to C1N, from one to N different areas of the first electro-active layer CP1.

One may at least either deform locally a single area using a single electrode EL connected to a power supply circuit, which is known as "zonal" control, or deform globally all the areas using all the N electrodes respectively connected to the N power supply circuits, which is known as "modal" control.

For example, in the case of modal control, the aberrations measured in the exit pupil, or reconstituted from images supplied by the instrument itself, are first projected onto a base of n Zernicke polynomials (orthogonal normalized polynomials with two variables p and E on a disk), which offers the advantage of classifying the defects of the optical instruments by decreasing order of influence. In this base, the wave surface (that is to say the aberrations) is therefore represented by a vector with n components that respectively represent the weights of the n polynomials in the global deformation of the wave surface (which should be a plane if the instrument were perfect).

Ignoring an amplitude coefficient, each polynomial describes an inherent shape that can best be produced by sending particular voltages to the N electrodes available. The control system therefore holds in memory n groups of N particular voltages. By weighting each group by the n components of the vector representing the wave surface and by effecting the algebraic half-sum for each electrode, N deformation control voltages are obtained canceling optimally the aberrations in the pupil. One may choose to correct only the first k defects associated with the first k polynomials. The greater the correction depth k, the more actuators must be disposed on the surface of the mirror.

Each power supply circuit $C1i$ is connected to the electric ground and to the contact of the front face FAC of the first electro-active layer CP1. Thus it is possible to establish locally a chosen potential difference in each area of the first electro-active layer CP1 situated in line with an electrode EL. This potential difference creates in the area concerned a transversal electric field (that is to say a field perpendicular to the first electro-active layer CP1) which induces a local deformation by electrical effect. This electrical effect is more precisely an electrostriction tending to vary the thickness of the first electro-active layer.

This variation of thickness follows a substantially quadratic law. For example, to obtain an increase of the thickness of the first electro-active layer CP1 of approximately 1%, it is necessary to apply to the electro-active material an electric field of about 40 MV/m, whereas to obtain a thickness increase of about 7%, it is necessary to apply to the electro-active material an electric field of about 170 MV/m.

The reflecting layer CR is for example produced from a metallic material such as gold, in particular for applications in the infrared domain, possibly with a protection layer. However, it may equally be made of silver or of aluminum protected for applications in the visible domain. It is for example deposited in a vacuum onto the front face FAC of the first electro-active layer CP1. For example, the reflecting layer CR confers a very good optical quality on the plane mirror M, typically $\lambda/50$ rms (root mean square—the square root of the average quadratic value that represents the norm of the deformation mirror M). The surface of the mirror being a plane, except for errors, the mean quadratic value is the integral, over all of the surface of the mirror, of the square of the errors, referred to that same surface.

The reflecting layer CR ensures the quality of the reflection in terms of absorbed energy, reflected energy and diffused energy, while the polish of the electro-active film (or layer) determines the optical quality of the mirror M.

If the stage E1 is produced in the form of a printed circuit, at least part of each electric power supply circuit $C1i$ may be defined therein. Furthermore, if the printed circuit is of 3D type and the electro-active material is single-layer, it is possible to connect the electric power supply circuits $C1i$ to the rear faces of the electrodes EL. This makes it possible to dispense with connecting wires or conductive tracks at the level of the front face FAE of the first stage E1.

The rear face of the first electro-active layer CP1 being placed on a rigid surface, in contrast to its front face FAC attached to the reflecting layer CR, the local deformation of an area ZD is effected by rapid flow of material at the level of said front face FAC of this area as well as at the level of the portion of the reflecting layer CR placed substantially on top of said area. This flow of material is reflected in the appearance of one or more bosses at the level of the front face FAC of the deformed area ZD as well as at the level of the portion of the reflecting layer CR placed on top of said area. The active face of the mirror M, situated on the same side as the reflecting layer CR, may therefore be deformed in such a manner as to compensate the geometric aberrations of the optical instrument in which said mirror M is installed.

Here "compensate the geometric aberrations" means correcting the phase differences of the reflected light waves, that is to say the wave surface.

The local deformation of the first electro-active layer CP1 depends on several parameters and in particular on its thickness, on the electro-active material from which it is made, and on the chosen potential difference, which equally depends on its thickness. For example, for an electro-active layer CP1 of copolymer doped with fluorine 100 µm thick and an HT voltage equal to about 17 kV, a deformation is obtained equal to about 7% of the thickness for an electric field of 170 MV/m, i.e. 7 µm of deformation.

For example to deform locally a chosen area of the first electro-active layer CP1, one may begin by applying the same voltage to all of the electrodes EL of the first stage E1, which induces a substantially constant increase of thickness over the whole of the first electro-active layer CP1, when all of its surface is controlled by electrodes EL, and thus a substantially uniform initial deformation. Then, the voltage applied to the electrode (or to the electrodes) that control(s) the chosen area to be deformed is reduced or increased in such a manner as to reduce or increase the amplitude of the initial deformation.

In the event of power supply failure, the uniform initial deformation disappears, thus leaving the reflecting surface plane, in contrast to the prior art electrostatic effect mirrors.

If the dimensions of the electrodes EL are (very) large relative to the thickness of the first layer CP1, typically 100 times, the local deformation, to which the first electro-active layer CP1 is subjected under the action of the applied electric field, takes substantially the form of a step resulting from an edge effect.

In order to extend this edge effect to the whole or part of an electrode EL, it is possible to define at least one recess in that electrode EL. Any shape of recess may be envisaged, and in particular a star shape with n branches (for example n=24), or a circular shape.

The number of electrodes EL having a recess may vary. It may be equal to one or more within an electrode stage. Furthermore, it may be envisaged that the shapes of the recesses differ from one electrode to the other.

Figure 4:
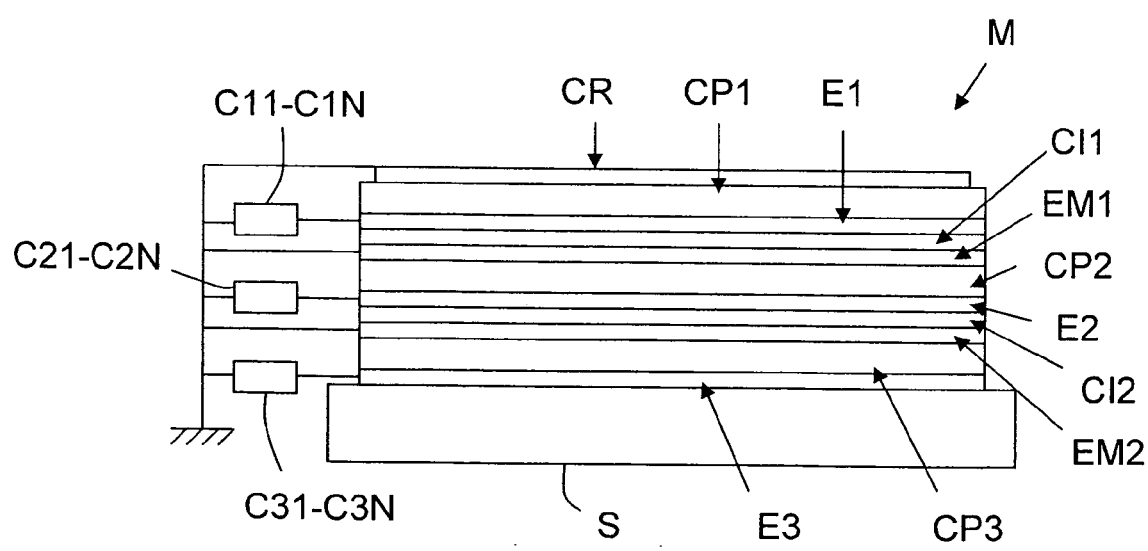
FIG. 4 shows diagrammatically, in a view in cross section, a second embodiment of a deformable mirror according to the invention.

In order to reduce the voltages applied to the electrodes, a multilayer structure of the type shown in FIG. 4 may be used. To be more precise, the voltage necessary for the deformation depending on the thickness of the electro-active layer, it is possible to use a plurality of (at least two) electro-active layers of medium or small thickness rather than a single layer of great thickness. Thus the deformation of 7 μm cited above may be obtained with ten layers of 10 μm thickness but with only 1.7 kV applied to each layer.

In the example shown in FIG. 4, the mirror M includes, disposed between the rear face of the first stage E1 and the front face FAS of the substrate S, a first interleaved insulative layer CI1, then a first interleaved conductor layer EM1 defining a ground electrode connected to the electric ground, then a second electro-active layer CP2 whereof the rear face is fastened to a second stage E2 including at least two plane electrodes EL, then a second interleaved insulative layer CI2, then a second interleaved conductive layer EM2 defining another ground electrode connected to the electric ground, then a third electro-active layer CP3 whose rear face is attached to the front face of a third stage E3 including at least two plane electrodes EL whereof the rear face is attached to the front face FAS of the substrate S.

In a simplified embodiment, the interleaved insulative layers CI1 and CI2 may be dispensed with. In this case, the interleaved conductive layers EM1 and EM2 are respectively interleaved between the rear faces of the first stage E1 and the second stage E2 of electrodes and the front faces of the second electro-active layer CP2 and third electro-active layer CP3.

In the example shown in FIG. 4, all the ground electrodes EM1 and EM2 (and the reflecting layer CR that also plays this role) are interconnected electrically and all the electrodes of the same stack (that is to say belonging to different stages but placed one above the other) likewise.

However, controlling all the electrodes with only two voltages, for example +U and −U, the ground potential being at the value zero (0), could be imagined. The amplitude of the deformation in accordance with a stack is then controlled by the number of electrodes placed at the above voltage or at zero voltage within this stack. With ten layers, the deformation is quantified approximately as one twentieth of the total possible deformation. In this case, the electrodes of the same stack are all independent of each other. To be more precise, the electrodes of the second stage E2 are connected to second electric power supply circuits C2$i$ (here i=1 to N), and the electrodes of the third stage E3 are connected to third electric power supply circuits C3$i$ (here i=1 to N).

By placing at chosen electric potentials the electrodes EL of the three stages E1 to E3, which are placed one on top of the other, it is possible to deform locally and simultaneously the corresponding three superposed areas and thus to obtain a cumulative deformation equivalent to that which would be obtained with a single electro-active layer of great thickness, but for a much lower voltage.

The plane electrodes EL of the second stage E2 may be of substantially the same shape and placed substantially in line with the electrodes of the first stage E1, just like those of the third stage E3.

However, this is not obligatory. It may be envisaged that the electrodes EL of the various stages E1, E2 and E3 are of substantially the same shape and placed one on top of the other in partially offset positions so as to partially overlap. This defines in line with each overlap of electrodes an area of deformation of smaller size than the electrodes involved in said overlap. In this case, the control voltages of the electrodes EL belonging to different stages must remain independent. For example, using electrodes of hexagonal shape, offset from one stage to the other, it is possible to define overlap areas of triangular type.

In this second embodiment, as in the first, it is possible to use electrodes EL including (at least for one of those of one of the stages) one or more recesses, in such a manner as to extend the edge effect induced by the electric effect to which each electro-active layer CP1, CP2, CP3 is subjected.

This multilayer solution may be envisaged because the electrodes are metallizations (produced in a vacuum or not) of a few microns thickness and which because of this do not really have any stiffness.

Figure 5:
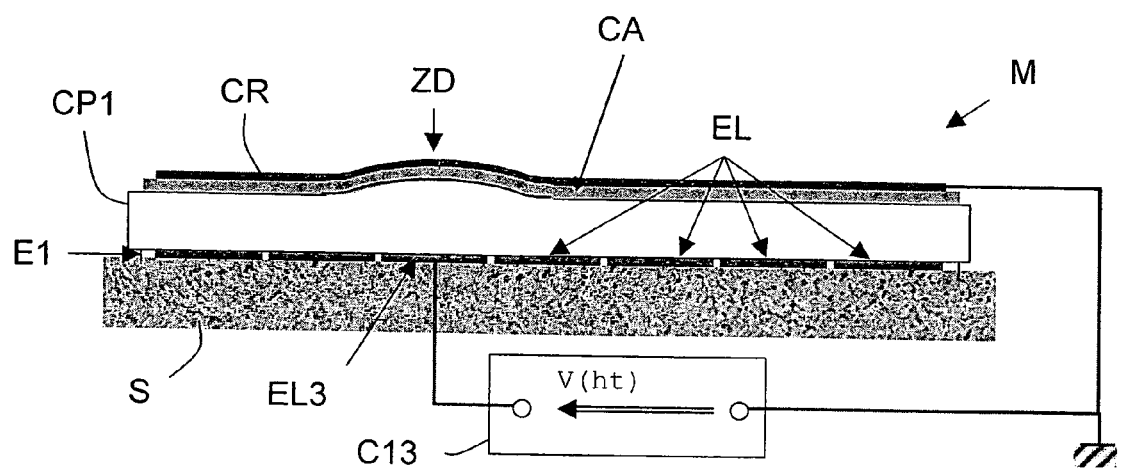
FIG. 5 shows diagrammatically, in a view in cross section, a third embodiment of a deformable mirror of the invention.

FIG. 5 is referred to next to describe a third embodiment of an active (or deformable) mirror according to the invention.

This third embodiment uses all the same components as the first embodiment, described previously with reference to FIGS. 1 to 3, and further includes a semi-rigid and conductive (or rendered conductive) interleaved additional layer CA.

This interleaved additional layer CA is interleaved between the reflecting layer CR, which defines a ground electrode, and the first electro-active layer CP1. It is intended to effect spatial filtering of the deformations induced in the first electro-active layer CP1 by the first electric power supply circuits C1$i$.

In effect, as previously mentioned, if the dimensions of the electrodes EL are (very) large relative to the thickness of the first layer CP1, typically 100 times, the local deformation substantially takes the form of a step resulting from an edge effect. The interleaved additional layer CA is therefore intended to "smooth" this step in such a manner as to define locally a boss having no (or virtually no) angular shape.

This interleaved additional layer CA is for example made from a metallic material or a semiconductor material, such as silicon, for example.

Moreover, this interleaved additional layer CA preferably has a thickness comprised between about 10 microns and a few hundreds of microns.

Furthermore, the interleaved additional layer CA is preferably attached by adhesion to the layers CR and CP1 that surround it. To be more precise, it is preferable to deposit the reflecting layer CR on the interleaved additional layer CA after having deposited the latter on the first electro-active layer CP1 before drying.

In this third embodiment, as in the preceding two, it is possible to use electrodes EL including, at least for one of them, one or more recesses, in such a manner as to extend the edge effect induced by the electric effect to which the first electro-active layer CP1 is subjected.

Figure 6:
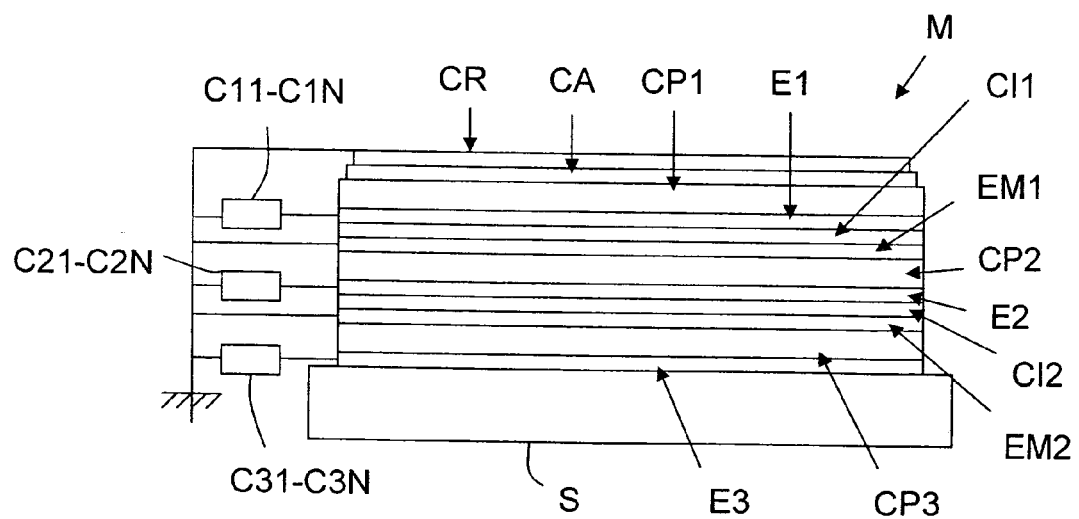
FIG. 6 shows diagrammatically, in a view in cross section, a fourth embodiment of a deformable mirror according to the invention.

FIG. 6 is referred to next to describe a fourth embodiment of an active (or deformable) mirror according to the invention.

This fourth embodiment uses all of the components of the second embodiment, described previously with reference to FIG. 4, and further includes a semi-rigid and conductive (or rendered conductive) interleaved additional layer CA interleaved between the reflecting layer CR (defining a ground electrode) and the first electro-active layer CP1.

This interleaved additional layer CA is identical to that described previously with reference to FIG. 5.

In this fourth embodiment, as in the preceding three, it is possible to use electrodes EL including, at least for one of them, one or more recesses, in such a manner as to extend the edge effect induced by the electric effect to which each electro-active layer CP1, CP2, CP3 is subjected.

Moreover, in this fourth embodiment, as in the second, the electrodes EL of the various stages may be entirely, or only partially, superposed one on the other.

Furthermore, the simplified variant of the second embodiment (shown in FIG. 4), that is to say with no interleaved insulative layer, applies equally to this fourth embodiment.

Figure 7:
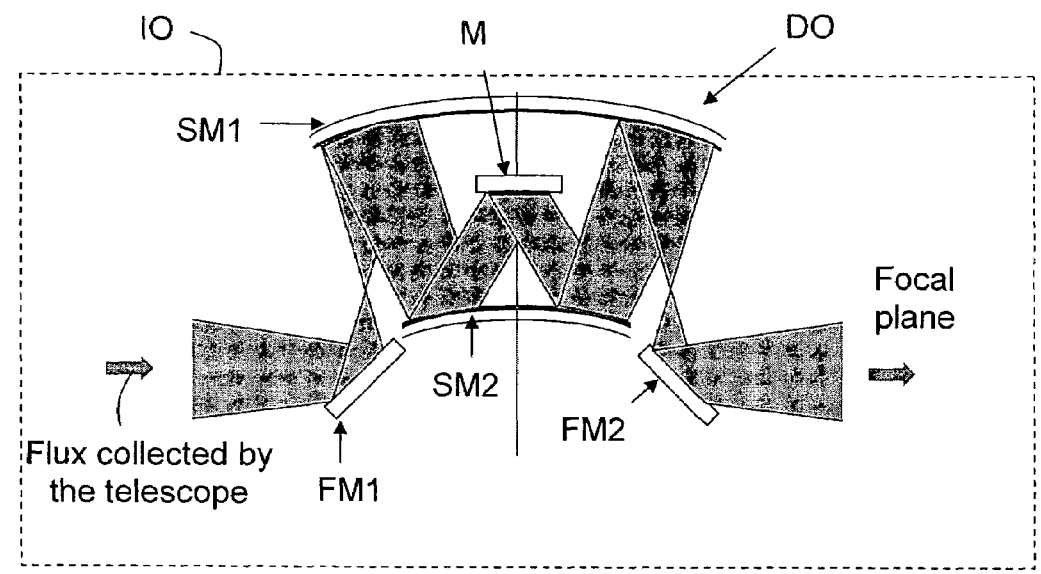
FIG. 7 shows diagrammatically, in a view in cross section, a first embodiment of a portion of a remote sensing instrument equipped with a deformable mirror according to the invention.

FIG. 7 shows a first, non-limiting, example of a portion of a remote sensing instrument IO equipped with a mirror M according to the invention. In this example, the instrument IO is a telescope, for example of Cassegrain or Korsch or Ritchey-Chrétien type, equipped with what the man skilled in the art knows as an Offner device DO, into which is integrated a deformable (or active) mirror M according to the invention.

This Offner device is intended to operate the deformable mirror M and more precisely to produce an image at the pupil of the telescope in the plane of the deformable mirror M in which the wave surface correction is effected. To do this, it intersects all of the light flux collected by the telescope before it reaches its focal plane.

The Offner device DO represented includes two deflector mirrors FM1 and FM2 and two spherical mirrors SM1 and SM2 between which is interleaved the deformable mirror M according to the invention.

The first deflector mirror FM1 is responsible for reflecting the flux of photons, that has been collected by the telescope (indicated by the left-hand arrow), in the direction of the first spherical mirror SM1, itself responsible for reflecting a first time the photons in the direction of the second spherical mirror SM2 which is in turn responsible for reflecting the photons a first time in the direction of the deformable mirror M, which reflects them toward the second spherical mirror SM2 which reflects them in its turn a second time toward the first spherical mirror SM1, responsible for reflecting them a second time toward the second deflector mirror SM2, itself responsible for reflecting them toward the focal plane of the telescope.

Figure 8:
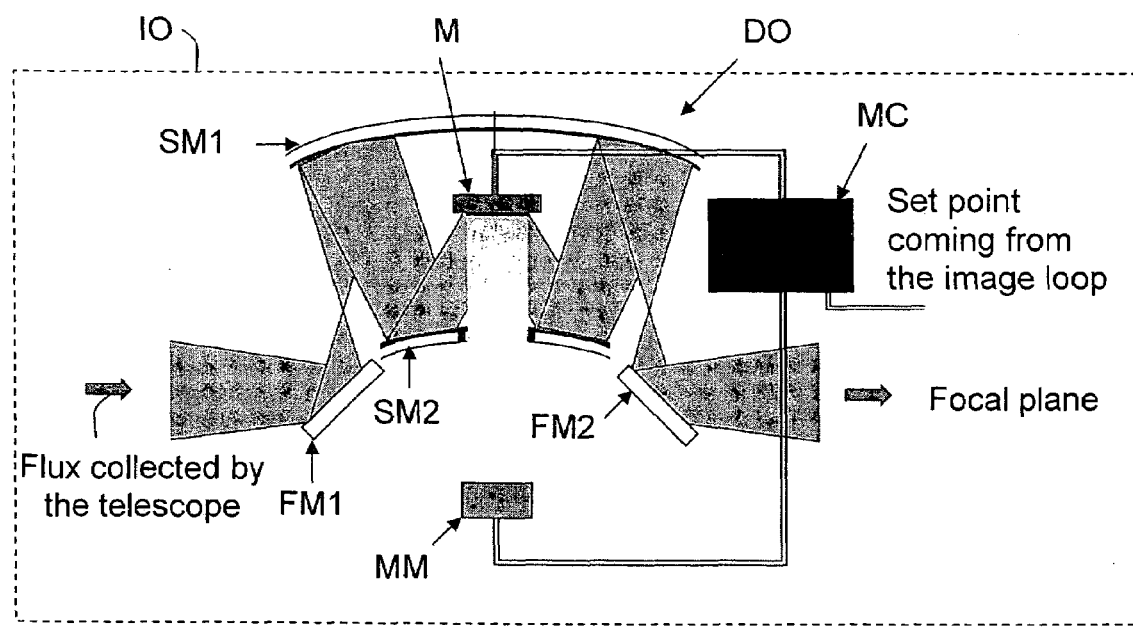
FIG. 8 shows diagrammatically, in a view in cross section, a second embodiment of a portion of a remote sensing instrument equipped with a deformable mirror according to the invention.

Moreover, in order to take account of any variations of behavior of the electro-active material constituting the electrodes EL, there may be added to the remote sensing instrument IO of FIG. 7 a local servocontrol loop intended to control precisely its various electrodes EL. Part of a remote sensing instrument IO of this kind is shown in FIG. 8.

The local servocontrol loop includes for example a measurement module MM responsible, for example, for effecting interferometric measurements on the active face of the deformable mirror M, and a control module MC responsible for controlling the voltages applied to the various electrodes as a function of the measurements supplied by the measurement module MM and the set point coming from the image loop of the telescope (not shown).

This shape correction principle may be applied to the whole of the reflecting surface of a telescope large mirror coated with the electro-active material as previously indicated. In this case, the servocontrol set point is produced from the ideal surface (for example a parabola) that the reflecting surface of the mirror must have. In orbit, the deformations come principally from thermal effects. On the ground, the deformations come equally from gravity effects as a function of the orientation of the telescope.

The invention is particularly advantageous, in particular for remote sensing missions in orbit because it does not impose any moving mechanical part. Furthermore, in the absence of supply voltage, the profile of the mirror remains unchanged (for example perfectly plane), virtually without displacement of its mean plane, so that the mirror does not vary the focal length of the optical instrument, which can therefore continue to function with a slight degrading of the images due to the absence of compensation of its geometrical aberrations.

The invention is not limited to the deformable mirror and optical instrument embodiments described hereinabove, by way of example only, but encompasses all variants that the man skilled in the art might envisage within the scope of the claims hereinafter.

The invention claimed is:

1. Deformable mirror, which comprises i) an electrically insulative substrate having a substantially plane front face, ii) a first stage comprising at least two plane electrodes placed at chosen places on top of said front face of the substrate, iii) a first layer of electro-active material placed in contact with a front face of the electrodes of said first stage and adapted to be deformed locally under the action of a chosen local difference of electric potential, iv) an electrically conductive reflecting layer, defining a ground electrode connected to an electric ground and placed on top of a front face of said first electro-active layer, and v) first electric power supply circuits each connected, on the one hand, to said electric ground and, on the other hand, to at least one of the electrodes of said first stage in such a manner as to impose locally, on command, a chosen potential difference adapted to deform locally an area of the first electro-active layer placed substantially in line with said electrode.

2. Mirror according to claim 1, which further comprises i) at least one second stage comprising at least two plane electrodes interleaved between said front face of the substrate and a rear face of the first stage, ii) at least one conductive interleaved layer, defining a ground electrode connected to said electric ground and interleaved between a rear face of the first stage and said second stage, iii) at least one second layer of electro-active material, interleaved between a front face of the electrodes of said second stage and a rear face of said conductive interleaved layer, and adapted to be deformed locally under the action of a chosen difference of electric potential, and iv) second electric power supply circuits each connected, on the one hand, to said electric ground and, on the other hand, to at least one of the electrodes of said second stage in such a manner as to impose locally, on command, a chosen difference of potential adapted to deform locally an area of the second electro-active layer placed substantially in line with said electrode.

3. Mirror according to claim 2, wherein the electrodes of each stage are substantially of the same shape and placed substantially one on top of the other.

4. Mirror according to claim 2, wherein the electrodes of each stage are substantially of the same shape and placed one on top of the other in partially offset positions so as to partially overlap.

5. Mirror according to claim 1, which comprises at least one insulative interleaved layer interleaved between a rear face of the first stage of electrodes and said conductive reflecting layer.

6. Mirror according to claim 1, wherein the first layer of electro-active material is attached by adhesion to the layers that surround it.

7. Mirror according to claim 1, wherein the first stage is a printed circuit on which said electrodes are defined.

8. Mirror according to claim 1, wherein said electrodes are connected to their respective electric power supply circuits by a rear face opposite their front face.

9. Mirror according to claim 1, wherein said electrodes of the first stage are of substantially hexagonal shape and disposed relative to each other in accordance with a triangular paving.

10. Mirror according to claim 1, wherein at least one of the electrodes of each stage comprises at least one recess of chosen shape.

11. Mirror according to claim 10, wherein said recess is of star shape with n branches.

12. Mirror according to claim 1, wherein each local deformation is a function of the chosen difference of potential, of the thickness of the electro-active layer concerned and of the type of the electro-active material of said electro-active layer concerned.

13. Mirror according to claim 1, wherein said electro-active material is a terpolymer.

14. Mirror according to claim 13, wherein said terpolymer is a copolymer doped with fluorine.

15. Mirror according to claim 1, wherein said reflecting layer is made from a metallic material.

16. Mirror according to claim 1, which comprises at least one semi-rigid and conductive interleaved additional layer, placed between said reflecting layer and said first electro-active layer.

17. Mirror according to claim 16, wherein said interleaved additional layer has a thickness comprised between about 10 microns and a few hundreds of microns.

18. Mirror according to claim 16, wherein said interleaved layer is attached by adhesion to the reflecting layer and to the first electro-active layer.

19. Optical instrument, which comprises a telescope coupled to a deformable mirror according to claim 1, wherein the deformable mirror is disposed in an optical path of the telescope so as to receive and reflect light collected by the telescope.

20. Optical instrument according to claim 19, which comprises servocontrol means adapted to effect measurements on the active face of said deformable mirror in such a manner as to control its shape by the voltages applied to its various electrodes.

* * * * *